G. D. POGUE.
INDICATOR FOR SHAFT BEARINGS.
APPLICATION FILED MAY 17, 1917.

1,303,387.

Patented May 13, 1919.

Inventor,
George D. Pogue.
By Bakewell Church, Attys.

UNITED STATES PATENT OFFICE.

GEORGE D. POGUE, OF ST. LOUIS, MISSOURI.

INDICATOR FOR SHAFT-BEARINGS.

1,303,387.     Specification of Letters Patent.     Patented May 13, 1919.

Application filed May 17, 1917. Serial No. 169,189.

*To all whom it may concern:*

Be it known that I, GEORGE D. POGUE, a citizen of the United States, residing at St. Louis, Missouri, have invented a certain new and useful Improvement in Indicators for Shaft-Bearings, of which the following is a full, clear, and exact description, such as will enable others skilled in the art to which it appertains to make and use the same.

In multi-cylinder engines and other machines in which a shaft is supported by a plurality of bearings arranged in longitudinal alinement, it is desirable to test the alinement of the bearings at regular and frequent intervals, in order to avoid shaft breakage or other damage to the engine or machine. Heretofore, this has been a laborious undertaking and considerable skill was required to insure accurate results.

The main object of my invention is to provide a simple means for testing the alinement of the shaft bearings of an engine or machine, without removing the bearing caps or other parts combined with the bearings, said means consisting of a device or instrument having no permanent connection with the machine and adapted to be removed from one bearing to the other, thereby enabling a single instrument or device to be used for testing all of the main shaft bearings of the machine.

Another object is to provide a practicable device or instrument that can be applied to the shaft bearings of a machine while the machine is undergoing the stresses dues to regular operation so as to test the alinement of said bearings.

And still another object of my invention is to provide a shaft bearing indicator that is particularly adapted for use with four-cycle Diesel engines and other types of machines in which the crank shaft lifts out of the lower bearing at the end of the exhaust stroke when the engine is in operation, which indicator is equipped with means for showing or indicating the amount of clearance between the shaft and the upper half of the bearing that is being tested. Other objects and desirable features of my invention will be hereinafter pointed out.

To this end I have devised a shaft bearing indicator that comprises two elements, one of which is adapted to be arranged in engagement with the shaft journaled in the bearing being tested, and the other in engagement with accurately machined surfaces, in close proximity to the shaft, that are not subjected to wear and which bear a certain fixed relation to the shaft at the time the shaft is originally fitted to its bearings, and means for showing any variation in the fixed relation between said shaft and machined surfaces, thus accurately indicating at all times during the years of regular operation, the condition of the shaft bearings of the machine. The indicator consists of an instrument or device that has no permanent connection with the machine whose bearings are to be tested, thereby enabling a single instrument to be used for testing all of the main shaft bearings of the machine. Furthermore, the device is so constructed that it coöperates with machined surfaces arranged on opposite sides of the main shaft of the machine in close horizontal relationship with said shaft. In the preferred form of my invention as herein shown the element of the device that coöperates with the machined surfaces consists of a removable member adapted to be arranged transversely of the shaft over the cap of the bearing and provided with supports whose ends contact with said machined surfaces. The element of the device that coöperates with the shaft consists of a longitudinally movable spindle or rod, and the means employed for indicating any variation in the fixed relation between the shaft and said machined surfaces consists of a visual indicator provided with a stationary element and a coöperating movable element whose position is governed by said spindle. My invention, however, is not limited to a shaft bearing indicator provided with elements arranged in the manner above referred to, therefore, various changes can be made in the form and arrangement of the device herein described without departing from the spirit of my invention.

Figure 1 of the drawings is a vertical cross-sectional view of a shaft bearing, showing my improved indicator arranged in operative position for testing the bearing or ascertaining the degree of wear on same since it was installed.

Figure 2:
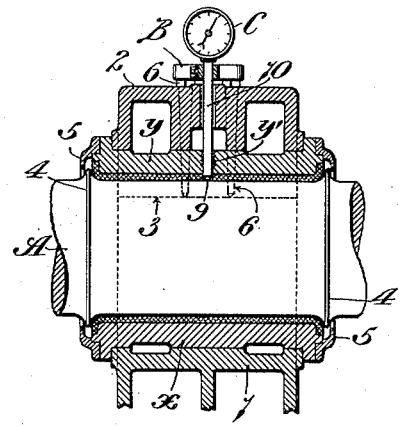
Fig. 2 is a vertical longitudinal sectional view of said bearing.

Referring to the drawings, which illustrate the preferred form of my invention, A designates a horizontally-disposed shaft that is journaled in a plurality of shaft bearings, each of which comprises a lower part $x$ that is supported by the base or frame 1 of the machine, and an upper part $y$ that is retained in position by a removable cap 2. The base or frame of the machine is provided with two horizontally-disposed machined surfaces 3 that extend longitudinally of the base on opposite sides of the shaft A. During the operation of fitting the shaft to its bearings or "scraping in" the shaft the bearings are scraped down sufficiently to cause the longitudinal axis and upper side of the shaft to extend absolutely parallel with the machined surfaces 3 and at a fixed or definite height above said machined surfaces, this being usually accomplished by the use of trams or height gages which are applied to the upper side of the shaft and to the machined surfaces 3. Later on, when the engine or machine is permanently installed, the machined surfaces 3 on the base are employed to level the base or frame 1 both longitudinally and laterally, after which the base or frame is permanently attached to a rigid foundation or support. After the machine has been in service for a certain length of time the alinement of the shaft bearings should be tested, as the wear on the bearings is generally not uniform, due to unequal or insufficient lubrication or to some other cause. A low bearing, of course, subjects the shaft to an undue bending stress when the machine is in operation, which sooner or later will result in crystallization, and thus cause breakage. With the engines now in general use it is impossible to test the alinement of shaft bearings without removing the cap 2 of each bearing. This, of course, makes it impossible to make such tests while the machine is in operation, and even after the cap and upper part of the bearing have been removed, a tram or height gage arranged in contact with the shaft and the machined surfaces 3 on the base necessarily gives no true indication of a low bearing. This, of course, is due to the fact that the shaft, which must be made very stiff, might be supported by two adjacent bearings without sufficient deflection to seat it in a low bearing when the shaft is not subjected to the load resulting from regular operation. The above condition makes it necessary to employ "feelers" or thin strips of metal between the lower half of the bearing and the shaft. This can not be done readily, especially if the shaft is provided with oil-throwing rings or flanges 4 like those shown in Fig. 2 of the drawings, without removing the stationary internally-flanged members 5 on the bearing, the removal of these flanged members 5 of course necessitating considerable labor and consuming considerable time.

Figure 5:
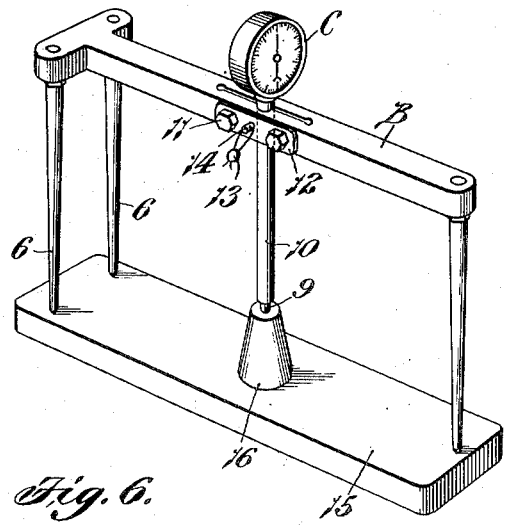
Fig. 5 is a perspective view, illustrating my improved shaft bearing indicator arranged in engagement with a means that is used for setting or adjusting the indicator so as to adapt it to a particular engine or machine, or subsequently checking the accuracy of the indicator.

In order to materially reduce the time and labor spent in checking up the shaft bearings of a machine, and in order that such bearings may be checked up accurately while the machine is in operation, I have devised the shaft bearing indicator illustrated in the drawings, which consists of a bar or member B adapted to be arranged transversely above the cap 2 of the bearing being checked and provided with supports 6 whose lower ends are adapted to be arranged in engagement with the machined surfaces 3 on the base of the machine. The member B is removable, or, in other words, has no permanent connection with the machine, and in the form of my invention herein shown said member B is provided at one end with a single support 6 and at its opposite end with two supports 6, as shown in Fig. 5, said supports being preferably arranged at right angles to the member B, so as to form a supporting means for said member that has a three-point contact with the surfaces 3. At a point midway of the length of the member B a visual indicator C is arranged, said indicator comprising a movable hand or needle 7 and a stationary scale 8 over which said needle travels in response to the longitudinal movement of a spindle 9 whose lower end is adapted to be arranged in engagement with the top side of the shaft A. The scale 8 is graduated into divisions, each of which represent some unit; for example, a one-thousandth part of an inch. The spindle 9 is guided by a sleeve 10, preferably secured to the casing of the visual indicator C, which sleeve is long enough so that it will surround the spindle 9 nearly its entire length, and thus overcome any tendency of said spindle to deflect or move laterally when the outer end of the spindle is in contact with the shaft A. The sleeve 10 also serves another important function; namely, it insures that the point of contact of the spindle 9 upon the shaft A will lie in a vertical plane intersecting the axis of said shaft.

Figure 1:
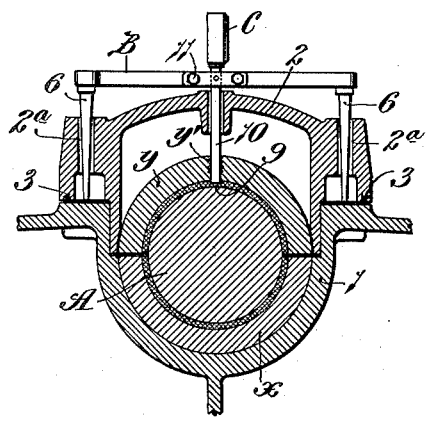
Figure 3:
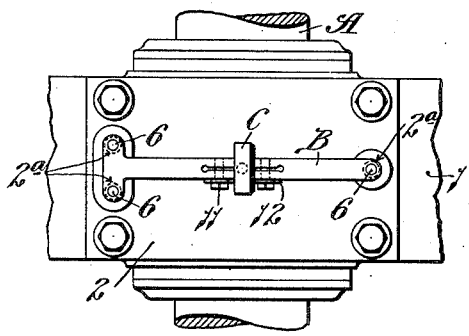
Fig. 3 is a top plan view of the parts shown in Fig. 1.
Figure 4:
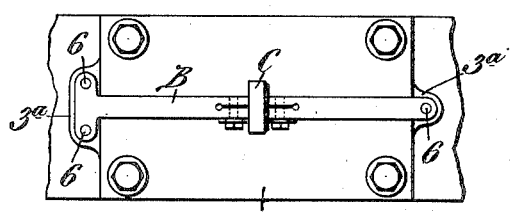
Fig. 4 is a top plan view, illustrating a slight modification of my invention.
Figure 7:
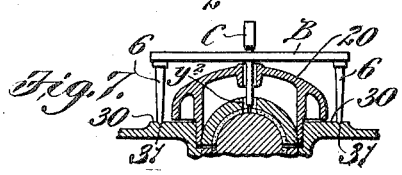
Fig. 7 is a vertical cross-sectional view, illustrating still another form of my invention.
Figure 6:
Fig. 6 is a front elevational view of the visual indicator of the device.

The cap 2 can either be provided with holes 2$^a$, as shown in Fig. 1, through which the supports 6 on the member B can be inserted, as shown in Figs. 1 and 3, or the cap 2 can be so designed that the supports 6 will straddle same, and thus rest on machined surfaces $3^a$ on the base of the machine that project laterally from the cap 2, as shown in Fig. 4. The top part $y$ of the bearing is provided with a hole $y'$, as shown in Fig. 1, that snugly receives the lower end portion of the guide 10 on the device when it is arranged in operative position, and thus holds the spindle 9 in a vertical plane intersecting the axis of the shaft. Said hole $y'$ is normally closed by a plug or closure of any suitable type (not shown) that is screwed in the hole $y'$, said hole being provided with internal screw threads, as shown in Fig. 1, and if desired, closures can be provided for the holes $2^a$ in the cap 2, which closures are normally arranged in operative position in the cap, so as to prevent dirt from collecting on the machined surfaces 3. While I prefer to use the hole $y'$ in the cap 2 to center the spindle 9 with relation to the shaft, I wish it to be understood that various other means could be used without departing from the spirit of my invention for locating said spindle so as to insure its contacting with the shaft in a vertical plane intersecting the axis of the shaft. For example, the cap 20 might be provided with a center hole $y^2$ considerably larger than the sleeve 10, and the machined surfaces 30 provided with depressions 31 for receiving the ends of the supports 6 on the member B, as shown in Fig. 7, said depressions 31 being so located with relation to the vertical axis of the shaft A that when the member B is arranged in position the end of the spindle 9 will engage the shaft at a point lying in a vertical plane which intersects the axis of said shaft.

With a shaft bearing indicator of the construction above described it is possible for even an inexperienced person to accurately check up the shaft bearings of a machine, owing to the fact that said indicator is so constructed that it will show, not only the downward movement, but also the upward movement of the shaft when the machine is in operation. When the machine is first permanently installed, presumably by some person particularly qualified by experience to do such work, the several shaft bearings of the machine are checked up, and after each bearing has been provided with a number a record is made of any slight deviation from true uniformity in the distance from the top of the shaft to the portions of the machined surfaces 3 in proximity to each bearing. After, say, thirty or sixty days' operation another set of observations may be made and the results compared with the previous record. If all of the shaft bearings have worn down an equal amount, say, two-thousandths of an inch, then there is no cause for uneasiness, but if some one particular bearing has worn down, say, five-thousandths or ten-thousandths of an inch more than the other bearings, then steps should be taken to determine the cause of this excessive wear and to correct the trouble.

In order to make it possible to set the needle 7 of the visual indicator C of the device at zero position, and thus enable the device to be used in connection with engines and machines in which the distances between the top side of the shaft and the machined surfaces vary, means is provided for enabling the sleeve 10 that serves as a guide for the spindle 9 to be raised and lowered. In the form of my invention herein shown the sleeve 10 is slidingly mounted in a split portion at the center of the member B, and clamping screws 11 are provided for securely clamping the sleeve 10 in adjusted position on the member B, said clamping screws 11 being locked in adjusted position by means of a locking plate 12 arranged in engagement with the heads of the screws and retained in position by means of a sealed wire 13 that passes through a perforated lug 14 on the member B that projects through a hole in said locking plate. In setting the device or adjusting it to a particular machine or engine, the supports 6 of the member B are placed upon a table or flat supporting surface 15, as shown in Fig. 5, which is equipped with a projection 16 whose height corresponds to the distance between the machined surfaces 3 of the machine and the top side of the shaft whose bearings are to be checked. The lower end of the spindle 9 is arranged in engagement with the upper end of said projection 16, and the sleeve 10 that guides said spindle is then raised or lowered in the member B until the hand 7 of the visual indicator C stands at zero on the scale 8. After the sleeve 10 has been set in the proper position, it is securely clamped and locked by the means previously described. Thereafter, when the device is applied to the bearings of the machine for which it is set or adjusted, the hand 7 of the visual indicator C will stand at zero on the scale, if the bearing being tested has not become worn. If the lower half $x$ of the bearing has become worn, said hand will move to the right of the scale 8 when the shaft deflects downwardly into the lower part of the bearing when the shaft is undergoing the stresses due to regular operation. If the upper half of the bearing has become worn, said hand will move to the left when the shaft deflects upwardly, due to the stresses produced on same when the machine is in normal operation. If desired, the scale 8 may be provided with the word "Low" arranged at the right of the zero point on the scale, and the word "High" arranged at the left of said zero point, so as to enable an inexperienced person to readily check up the bearings and keep a record of the wear on the bearings.

A shaft bearing indicator of the construction above described shows accurately the degree of wear on both the upper and lower parts of a bearing, because it coöperates with machined surfaces that are arranged in close proximity to the horizontal axis of the shaft on opposite sides of said shaft. It can be used for testing all of the main shaft bearings of the machine, and furthermore, can be used without removing the caps of the bearings and other parts associated with same, as has heretofore been necessary. The fact that the device can be used for checking up the bearings of a machine when the machine is in operation, adapts it particularly to use with Diesel engines and other machines in which the crank shaft undergoes such great stresses during the normal operation of the engine that it will lift out of the lower half of the bearing and deflect downwardly out of the upper half of the bearing, in case the bearing is worn.

Having thus described my invention, what I claim, and desire to secure by Letters Patent, is:

1. A shaft bearing indicator, comprising a member that is adapted to be arranged transversely of the shaft in a bearing, depending portions on said member that are adapted to engage stationary surfaces located in close proximity to the shaft, which surfaces are separate and distinct from the shaft and bear a fixed relation to the shaft at the time the shaft is originally fitted to the bearing, a movable member carried by the member first referred to and adapted to be arranged in engagement with the shaft, and means coöperating with said movable member for indicating any variation in the fixed relation between said shaft and stationary surfaces.

2. An indicator for a horizontally divided shaft bearing, comprising a member that is adapted to be rested upon accurately machined horizontal surfaces separate and distinct from the shaft and located in close proximity to the horizontal dividing plane between the two parts of the bearing, a movable member on the member first referred to that contacts with the shaft, and an indicating means combined with said members in such a manner that it will operate in case the bearing has become worn and accurately show the degree of wear on the bearing.

3. A shaft bearing indicator, comprising a member that is adapted to be arranged transversely of the shaft in a bearing, a depending tripod on said member that rests upon horizontal machined surfaces located on opposite sides of the shaft in close proximity to the horizontal axis of the shaft, said machined surfaces being separate and distinct from the shaft and formed on the structure that carries the lower half of the bearing, a movable member on the member first referred to that engages the shaft, and a visual indicating means comprising a graduated scale and a movable hand combined with said members in such a manner that said hand will move in one direction in case the upper part of the bearing has become worn and will move in the opposite direction in case the lower part of the bearing has become worn.

4. A shaft bearing indicator, comprising a member that is adapted to be arranged transversely of the shaft in a bearing and provided with supporting portions that rest upon horizontally disposed surfaces located on opposite sides of the shaft in close proximity to the horizontal axis of the shaft, which surfaces are separate and distinct from the shaft and bear a fixed relation to the shaft at the time it is originally fitted to the bearing, a movable member on the member first referred to that is adapted to be arranged in engagement with the shaft, a guide for said movable member that projects downwardly from the member first referred to and causes said movable member to engage the shaft at a point lying in a vertical plane which intersects the axis of the shaft, and means combined with said member for indicating any variation in the position of said movable member when the device is in use, thus showing the degree of wear on the bearing.

5. A shaft bearing indicator, comprising a member that is adapted to be arranged transversely of the shaft in the bearing being tested above the cap of said bearing, a depending tripod on said member that contacts with stationary surfaces located on opposite sides of the shaft in close proximity to the horizontal axis of the shaft, a vertically-adjustable guide on said member, a vertically-movable spindle in said guide that projects downwardly through an opening in the cap and contacts with the shaft, and an indicator carried by said guide and combined with said spindle for indicating the the condition of the bearing.

6. A shaft bearing indicator, comprising a member that is adapted to be arranged transversely above the cap of a bearing, supports on said member which bear upon stationary horizontal surfaces located in close proximity to the horizontal axis of the shaft in the bearing on opposite sides of said shaft, a vertically-adjustable sleeve or guide carried by said member and provided with an indicator comprising a graduated scale and a movable hand, and a spindle reciprocatingly mounted in said guide and operatively connected with said hand, said spindle being adapted to be inserted through alined openings in the cap and in the top part of the bearing so that it will contact with the shaft.

7. A shaft bearing indicator, comprising a member adapted to be arranged transversely of a shaft above the cap of the bearing in which the shaft is journaled, supports on said member that are adapted to rest upon accurately machined horizontally-disposed surfaces located at opposite sides of said shaft, a vertically-disposed guide adjustably mounted in said member and arranged at right angles to the same, means for locking said guide in adjusted position, a visual indicator carried by said guide, and an actuating means for said indicator comprising a spindle reciprocatively mounted in said guide and adapted to be inserted through alined openings in the cap and in the top part of the bearing so that the lower end of same will rest on said shaft at a point lying in a vertical plane which intersects the axis of the shaft.

GEORGE D. POGUE.